United States Patent [19]
Bernardini et al.

[11] Patent Number: 5,754,794
[45] Date of Patent: May 19, 1998

[54] SUBBAND CODING USING LOCAL BASES IN MULTIPLE DIMENSIONS

[75] Inventors: Riccardo Bernardini, Watchung, N.J.; Jelena Kovacevic, New York, N.Y.

[73] Assignee: Lucent Technologies Inc., Murray Hill, N.J.

[21] Appl. No.: 545,077

[22] Filed: Oct. 19, 1995

[51] Int. Cl.⁶ .................................................. H04N 1/41
[52] U.S. Cl. ........................................ 395/200.77; 348/398
[58] Field of Search .................. 364/514 R, 715.02, 364/724.01; 395/114, 200.77; 348/410, 412, 415, 398

[56] References Cited

U.S. PATENT DOCUMENTS 5,481,308   1/1996   Hartung et al. ....................... 348/398
5,629,737   5/1997   Menez et al. ......................... 348/398

*Primary Examiner*—James P. Trammell
*Assistant Examiner*—Thomas Peeso
*Attorney, Agent, or Firm*—Bruce S. Schneider

[57] ABSTRACT

A method and apparatus for encoding and decoding multi-dimensional signals is disclosed. Non-separable multi-dimensional filters are utilized. Analysis filters encode the signal by applying a windowing function and a reduction function to the multi-dimensional signal. This produces a prototype. The prototype is then replicated as many times as required by utilizing a modulation function. Synthesis filters then decode the encoded signal by utilizing the inverse of the encoding process.

27 Claims, 4 Drawing Sheets

MAGNITUDE FREQUENCY RESPONSE

SUBBAND CODING USING LOCAL BASES IN MULTIPLE DIMENSIONS

FIELD OF THE INVENTION:

The present invention relates to the coding of information. More specifically, the present invention relates to encoding and decoding of information contained in images and videos.

BACKGROUND OF THE INVENTION:

The average movie or situation comedy displayed on a television ("TV") set is an audio visual program. These audio visual programs are usually transmitted from a remote television station in the form of a video signal to the home TV, where they can be viewed or taped by a image/videocassette recorder ("VCR") and replayed. A video signal is a sequence of images. When a full show is played on the TV, the show is really a set of images that are continuously displayed one after the other. An image on the other hand would be what is displayed on the TV when the "freeze frame" button on the VCR is pressed.

An image designed to be displayed on, e.g. a TV is composed of a set of picture elements (pixels). The pixels are the individual units of an image that combine to give you the fill picture. They can be thought of as little color dots that combine to form a picture. Each pixel has a color composed of a combination of red(r), green(g), blue(b). The image is usually processed(each pixel is separated into its component colors) several times to extract the intensity levels of r,g, and b that combine to make the color that the human eye sees(ie.orange, purple). For example, an image that has N×N pixels may be processed three times to extract the r, g, b, color values associated with each pixel. After the image is so processed the r, g, and b, color values may each be represented as an N×N matrix. Therefore, the image may be defined by three matrices, one for red, one for green, and one for blue, each of size N×N.

When the image is a digital image typically each of the components of color(r,g,b) is represented by eight bits. As a result, it takes 24 bits ("1's" or "0's") to represent one pixel of the image. Since pixels make up an image, an entire image can be decomposed into a long sequence of "1's" or "0's". Since a video is nothing more than a sequence of images, a video can also be decomposed into a series of "1's" and "0's".

There are several types of signals that can be represented as bits. There are one-dimensional signals such as audio signals. When a signal is represented in more than one dimension it is called a multi-dimensional signal. An image for example is a two-dimensional signal, it is defined by a horizontal component(x) and a vertical component(y). An analysis system that processes the two-dimensional image is called a two-dimensional analysis system. Therefore, a two-dimensional analysis system is a function of x and y ( f(x,y)).

A video is a multi-dimensional signal. Each image in a video is defined by a horizontal component(x) and the vertical component(y). In addition, the images are separated by time(t). The first image may be put on the TV screen at time t=1, the second image at time t=2, and so on. Displaying these images one after the other gives the viewer the illusion of full motion video. Therefore, a video is a three-dimensional signal, and the systems used to analyze video images are three-dimensional systems f(x,y,t).

The memory used to store and the communication channels used to transmit a multi-dimensional signal (i.e., an image/video signal) are costly. Different techniques are used to "compress" a signal prior to its transmission over the communications channel and/or storage onto a storage medium (e.g., a VCR tape). Thus, all compression techniques address the issue of how to represent the image/video with as few bits as possible while maintaining image/video quality.

One technique for compressing images is known as "subband coding." FIG. 1 displays a subband coding system. In FIG. 1, a signal 10 passes through a set of bandpass filters housed in an analysis system 20. This results in a set of subbands. The subbands are then sampled by a sampler 30 at a fast enough rate (i.e., a minimum of twice the number of subbands per unit time) to allow recovery of a sampled version of the information. Once sampled, the subband signals are ready for encoding, transmitting and decoding as denoted by 40. The subband signal is resampled by the sampler 50, and then recombined into one signal through a set of filters in a "synthesis" process 60. The principals of subband coding are described generally in N. S. Jayant and P. Noll, *Digital Coding of Waveforms: Principles and Applications to Speech and Image/video*, ch. 11, Prentice-Hall, Englewood Cliffs, N.J., 1984. The application of subband coding techniques to image/video signals are described in, e.g., *Subband Image Coding* (J. W. Woods, ed.), ch. 2, Kluwer Academic Publishers, Boston, Mass., 1991.

FIG. 2 displays a schematic of the analysis system for a one-dimensional system. The signal 10 is fed into the analysis system 20. The analysis system 20 is composed of bandpass analysis filters 25, which separate the signal into subband signals 27. The signal 10 can be separated into bits where each group of bits has a value that represents the intensity level of r,g, and b in the pixel . The pixels may be represented as $x[n]$, where X is the total of all the input bits and n is unit time. Therefore, $x[n]$ could be a row or column matrix of a sequence of values where the first number represents the color of the first pixel, the second value represents the color of the second pixel and so on, until the full picture has been processed. The bandpass analysis filters 25 could be represented as $h[n]$ where H is the total of all the bandpass analysis filters. H would be several row or column matrices (one for each bandpass analysis filter), put together to form a matrix. The subband signals may be represented as $y[n]$, where Y represents all of the subband signals. The matrix multiplication of the input signal(X) denoted by 10, and the bandpass analysis filters(H) denoted by 25, would produce the subband signals(Y) denoted by 27. Representing the signal 10 as X, the bandpass analysis filters 25 as H and the subband signals 27 as Y, the analysis system 20 may be represented as $Y=H^T*X$, where $H^T$ is the transpose of H.

For example, take a two-dimensional analysis system that creates four subbands. Four bandpass filters would be required to create four subband signals. The four bandpass analysis filters will be referred to as $h_1$, $h_2$, $h_3$, $h_4$. The circuitry chosen to implement the four bandpass analysis filters in this example, could be represented mathematically as four 4×4 matrices, where each matrix has sixteen entries. However, other circuit designs could also be implemented which are represented by different matrix configurations Thus $h_1$ has entries $h_{1(1,1)}, h_{1(1,2)}, h_{1(1,3)}, h_{1(1,4)}, \ldots, h_{1(4,4)}$, where (1,1), (1,2),etc is in the form (a, b) with "a" representing the row of the matrix and "b" representing the column. Likewise, filter $h_N$(for N=2,3, and 4) would have entries $h_{N(1,1)}, h_{N(1,2)}, h_{N(1,3)}, h_{N(1,4)}, \ldots, h_{N(4,4)}$. If the sixteen entries for each of the four filters are arranged in a 16×1 matrix and each such matrix is placed side by side, the result would be a 16×4 matrix H, which is representative of all the bandpass analysis filters in the analysis system. In order to perform analysis on, e.g., sixteen pixels (e.g., $p_1, p_2, \ldots, p_{16}$) of an image, each 16×1 bandpass filter of H is multiplied with the sixteen pixels. The results of each multiplication are added. Thus for $h_1$, the result, R, is obtained by performing the following calculation:

$$R=(h_{1(1,1)} \times p_1 + h_{1(1,2)} \times p_2 + \ldots + h_{1(4,4)} \times p_{16})$$

In order to calculate R as shown above, sixteen multiplication operations and fifteen addition operations must be performed. In general, if four 4×4 subband filters are used to filter 16 pixels, sixty four multiplications and sixty additions are needed to calculate the resultant matrix R1,R2,R3,R4. The foregoing technique is used with any number of filters, for example, producing eight bandpass filters of size 8×4 would require 256 multiplications and 248 additions.

Implementing these bandpass filters would require a number of circuits providing adding, subtracting, multiplying, and delay operations. The circuit elements would add to both the cost and complexity of the analysis system. Therefore it is important to define H, so that efficiencies will occur, which would lead to less complex circuit implementations.

One approach for achieving these efficiencies uses "separable" filters. In a separable filter, each filter may be represented by a set of numbers arranged in, e.g., a matrix. A filter with M rows and N columns (i.e., an M×N filter) is said to be "separable" if it can be formed by a matrix product of a M×1 matrix and a 1×N matrix. So, for example, the M×N (M=3;N=2) matrix $$\begin{bmatrix} 9 & 15 \\ 15 & 25 \\ 3 & 5 \end{bmatrix}$$

is said to be separable since it may be obtained by multiplying an M×1 matrix (e.g., $$\begin{bmatrix} 3 \\ 5 \\ 1 \end{bmatrix}$$

with an 1×N matrix (e.g., [3 5]). Separable filters are desirable when designing analysis systems because the circuitry is easy to implement. However, separable filters are limited in the number of design options that they give the designer. Separable filters are said to have fewer "degrees of freedom." As an example, the M×N separable filter shown above is said to have five "degrees of freedom." This means the filter designer is allowed to select five values. In this example, three values were selected for the M×1 matrix and two values were selected for the 1×N matrix.

In general, an M×N separable filter has M+N degrees of freedom. The more degrees of freedom in a filter, the more accurate the reproduction of the image at the decoder will be, because filters can be more closely designed to accomplish the desired result.

Alternatively the following matrix, $$\begin{bmatrix} 9 & 15 \\ 15 & 25 \\ 3 & 6 \end{bmatrix}$$

is considered a non-separable filter because there is no way of multiplying two matrices as defined above to get the resulting matrix. The non-separable filter given above is said to have 9 degrees of freedom, one degree of freedom for every value in the filter. The circuit designer is constrained when using these filters because while there are more degrees of freedom, the circuitry required to implement the combination of values in this matrix would be complex. Therefore while you gain more degrees of freedom in a non-separable filter, circuit implementation of the filter is more complex.

In one example of a one-dimensional encoding system, the analysis system is defined by H=W G, where W is a windowing matrix and G is a modulation matrix based on a sinusoidal function. FIG. 3 displays a frequency based representation of the set of one-dimensional bandpass filters. The graphs in FIG. 3 are the amplitude of the Fourier transform of the following equation:

$$h_i[n] = w[n] * \cos(f_i[n]),$$

where $h_i[n]$ represents a bandpass analysis filter, $w[n]$ represents the window, and $\cos(f_i[n])$ are the cosine values in the G matrix associated with the filter, where $f_i[n]$ is the frequency response at the time n. For the current example, one representation of G would be the following:

$$\cos \begin{bmatrix} -3\pi/8 & -\pi/8 & \pi/8 & 3\pi/8 & 5\pi/8 & 7\pi/8 & 9\pi/8 & 11\pi/8 \\ -9\pi/8 & -3\pi/8 & 3\pi/8 & 9\pi/8 & 15\pi/8 & 21\pi/8 & 27\pi/8 & 33\pi/8 \\ -15\pi/8 & -5\pi/8 & 5\pi/8 & 15\pi/8 & 25\pi/8 & 35\pi/8 & 45\pi/8 & 55\pi/8 \\ -21\pi/8 & -7\pi/8 & 7\pi/8 & 21\pi/8 & 35\pi/8 & 49\pi/8 & 63\pi/8 & 77\pi/8 \end{bmatrix}$$

The graph in FIG. 3 shows the magnitude frequency response of the filters($h_1, h_2, h_3, h_4$). The filters are plotted as a function of frequency (x axis). The magnitude frequency response of the subband analysis filters $h_1[n], h_2[n], h_3[n]$, and $h_4[n]$, are represented by 100, 110, 120 and 130, respectively. In FIG. 3, each subband filter separates the signal x[n] into a different frequency range. The concept of moving the signal into different frequency ranges is known as modulation. Applying the G matrix to the input signal has the physical effect of shifting the filters along the frequency spectrum by modulating the input signal x[n]. The window W systematically parses through the input signal x[n] so that different parts of the signal x[n] can be modulated. The technique of parsing through the input signal with a window and then modulating the input signal is an efficient way to implement filters because only one prototype filter has to be built and then that sampler filter is applied to different parts of the input signal.

The modulation function G modulates the part of the signal x[n] that is in the Window (W) to different parts of the frequency spectrum thereby producing all the filters 100, 110, 120, and 130. The values of a modulation function in the one dimensional case are based on a sinusoidal function. These values produce a perfectly reconstructed signal. Traditionally G is a modified discrete cosine transform.

Although this technique has been applied in the one-dimensional case to audio signals, the technique is not available for multi-dimensional signals(unless the technique is used separately along the dimensions). In the case of a multi-dimensional system several filters would have to be designed, in addition, multi-dimensional systems are usually designed with non-separable filters which increases the difficulty of the design.

There are similarities between designing a digital filter and designing an analog circuit. In designing an analog circuit the circuit designer has to put together the elements of the circuit(i.e. resistors, capacitors, transistors) that perform the desired function of the circuit(ie. generating voltage, current, etc). The design of filters is no different. A filter designer has to put together the combination of components (i.e. adders, subtractors, multipliers, and delay elements) that will perform the desired operation on the signal. Since the circuitry that is used in filters can be expressed as mathematical equations and matrices, the filter designer has to choose the mathematical equations and matrices that will perform the desired function on the signal being processed.

Choosing filter components is like putting together a puzzle. A designer has to choose the components that will produce the desired output signal. Since a filter is defined mathematically by $Y=H^TX$, where H is the filter matrix, the values of the matrices that compose H (i.e. W*G), have to be chosen very carefully. In a puzzle each piece has to fit together to produce the picture, in the same way in a filter, each matrix has to fit together to produce the desired output signal.

In filter design, it is often difficult to find simple circuits (matrices), that fit together to produce the required signal. In addition, the difficulty of finding simple circuits that fit together is increased because the modulation matrix (G) is based on a sinusoidal function(ie. sine, cosine). Since G has to be based on a sine or cosine, it limits the possible values that the G matrix can have, and since the filter is like a puzzle, the possible values of W are also limited.

All the possible values that a matrix can have are called the search space of the matrix. The larger the search space of the matrix the greater the variety of designs that can be used for the filters. The smaller the search space, the smaller the variety of designs. It would be advantageous to increase the search space, thereby increasing the variety of circuit elements that can be used to implement a filter.

As discussed above matrices are also defined as separable and non-separable. Separable filters have a relatively easy circuit implementation, but non-separable filters have a larger number of "degrees of freedom"(greater search space). It would be advantageous to increase the search space of the filter designer, and in addition, use non-separable filters.

SUMMARY OF THE INVENTION

The present invention involves an encoding/decoding technique. The technique increases the search space available to a filter designer by allowing use of non-separable filters, as well as filters (separable and non-separable) that are based on non-sinusoidal functions. Specifically, a window(W) consecutively samples an input signal, thereby defining the portions of the input signal that will be processed. Next, a reduction process(K) reduces the amount of bits required to represent the signal, by exploiting the symmetry in the signal. Lastly, a modulator based on both sinusoidal and non-sinusoidal functions, modulates the windowed portions of the signal to a different point in the frequency spectrum, to produce subbands.

BRIEF DESCRIPTION OF THE DRAWINGS

The objects, advantages and novel features of the invention will be more fully apparent from the following detailed description when read in connection with the accompanying drawing wherein.

DETAILED DESCRIPTION

Figure 1:
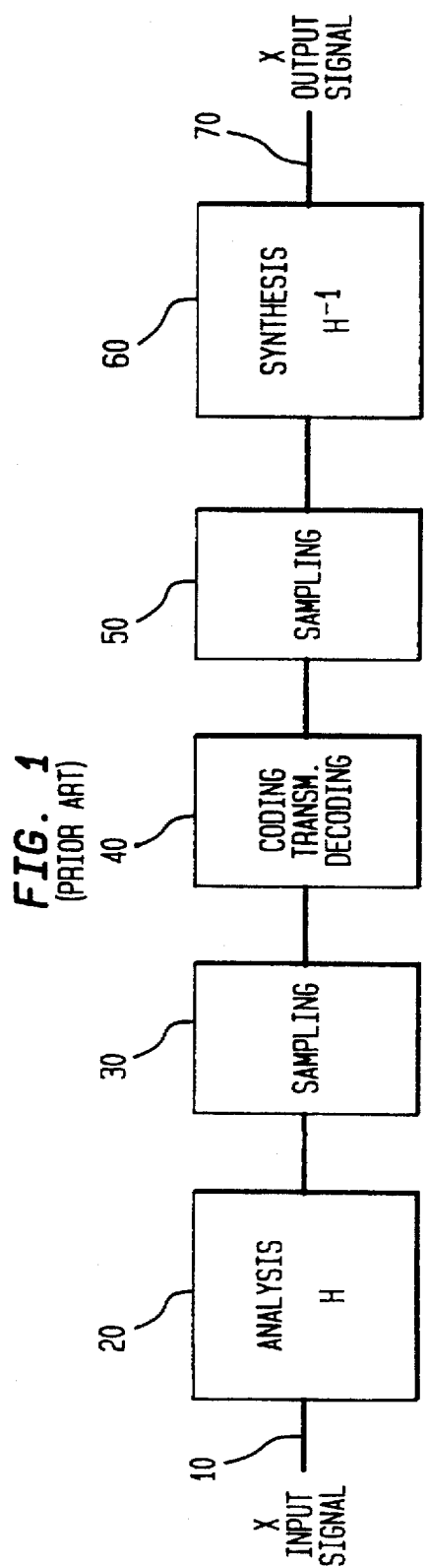
FIG. 1. displays a subband analysis/synthesis system.
Figure 2:
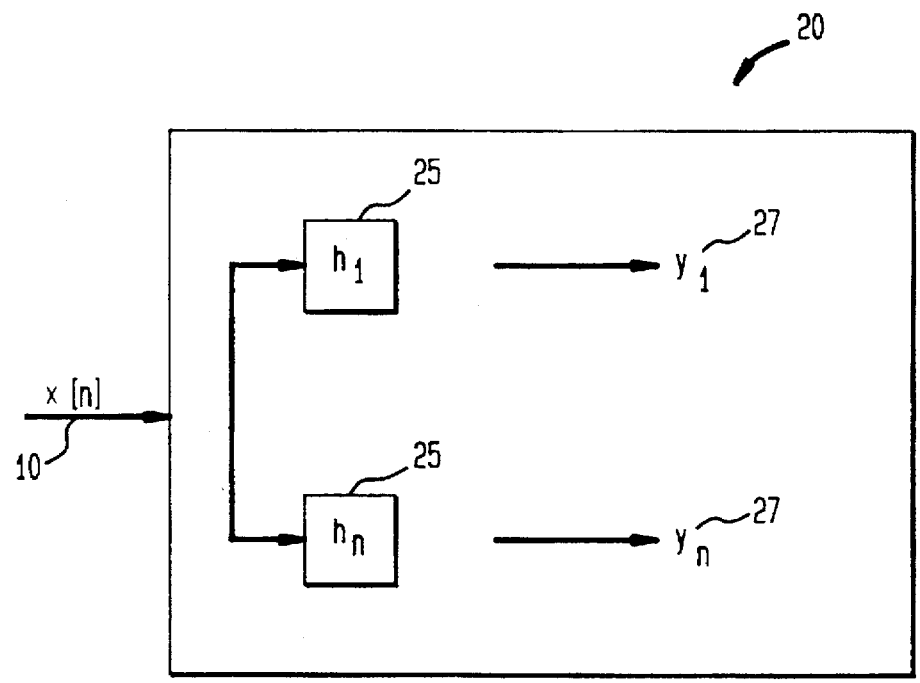
FIG. 2. details the analysis system 20 of FIG. 1.

A multi-dimensional encoding/decoding system, comprised of filters, is disclosed. A multi-dimensional signal is generated and a windowing prototype(W) is applied to the multi-dimensional signal. The window moves through the multi-dimensional signal, taking one group of samples at a time. The circuit implementation of the windowing prototype (W) is a low pass filter. The matrix representation of the window (W) is a matrix that has very small variation in the magnitude of the numbers along the diagonal of the matrix. Mathematically, the sum of the squares of the values on the diagonal of the matrix is a constant that depends on the sampling factor (n/2 in a one-dimensional case). A reduction process (K) is then applied to the multi-dimensional signal. The reduction function exploits symmetry in the signal to reduce complexity of the circuitry required to implement the filters used in processing the signal. Both the prototype W, and the reduction circuit (K) are defined by the application that the filter is being used for. As an example, in the case of the reduction circuit(K), if the application is an image in which the upper left quadrant of the image and the lower right quadrant of the image are the same, the reduction circuit could be designed to erase one of these areas and reconstruct the missing portion in the synthesis portion of the circuit. When the reduction circuit is represented as a matrix, the reductions are noticeable because the reduction matrix(K) has a smaller dimension than the window(W). Lastly, modulation is performed with a basis function(G). The circuit that implements the modulation function utilizes the window prototype(W), by repeatedly using the window prototype to process portions of the signal x[n].

The modulation circuit(G) has to have a circuit design, that can reverse the modulation performed by G, so that the input signal X can be reconstructed. If the modulation circuit (G) is implemented as a matrix, this would mean that $G^{-1}*G=I$, Where $G^{-1}$ is the inverse of G and I is the identity matrix. Physically, in a circuit implementation of the modulation function, a reverse circuit $G^{-1}$ would be a circuit placed in the synthesis portion of the decoding system, to reconstruct the signal modulated by G. When the search space of G is based on a sinusoidal functions(sine, cosine), it limits the amount of inverse circuits that are available. The use of non-sinusoidal functions are disclosed for G, thereby increasing the search space of invertable circuits, because by using non-sinusoidal functions, there is a much greater number of waveforms that G can be based upon.

The sum of all the subband signals Y, is defined by the relationship $Y=H^T*X$, where $H=W*K*G$, W is a window function, K is a reduction function, G is a modulation function, X is a multi-dimensional input signal, and $H^T$ is the transpose of the matrix H.

An analysis system defined by the relationship $Y=H^T*X$ could be implemented to separate a signal into a number of subbands. To implement an analysis system defined by the relationship $Y=H^T*X$, the functions performed by WKG are implemented with bandpass filters. As detailed above in the discussion of separable filters, bandpass filters may be represented by matrices. However, although these filters are represented by matrices it should be appreciated that each value in the matrix corresponds to a circuit value or operation. Since analysis/synthesis systems are composed of bandpass filters, it should also be appreciated that systems of matrices can be used to represent the circuit implementation of the analysis/synthesis systems. As a means of illustration, a four subband system is presented. In a four subband system, the matrix $H^T$ would be represented by a matrix in the following form:

$$[h_{1ij}|h_{2ij}|h_{3ij}|h_{4ij}]$$

where $h_{1ij}$ represents generically all matrix elements of the first filter, $h_{2ij}$ the second, and so on.

In a subbanding system as disclosed in the present invention, a multi-dimensional signal is processed. However, to facilitate easy understanding, the graphical representations of the signals presented in FIGS. 4,5,6 and 7 are of a one-dimensional signal. To display a three-dimensional case a three dimensional contour plot would be required. Therefore, it should be appreciated that the technique disclosed applies to multi-dimensional signals although the graphical representations used in FIGS. 4, 5, 6, and 7 are one-dimensional graphs used to facilitate understanding.

Figure 4:
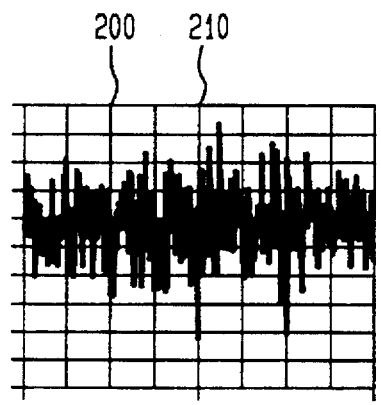
FIG. 4. displays a digitized input signal taken from an oscilloscope.

FIG. 4 displays an actual signal x[n]. The graph presented is a plot of the unit time versus the amplitude. The curves in FIGS. 4, 5, and 6 appear continuous, but they are each a sampling of 800 values placed closely together, therefore they have the appearance of being continuous waveforms.

As detailed above, filter design is similar to putting together a puzzle. Once one component of the puzzle is defined, other components of the filter have to be defined to match the first component. In our example, if four subbands are desired the analysis matrix H can be implemented as four 4×4 matrices. If the circuitry used to implement W is implemented as a 16×1 matrix, then because of the relationship H=WKG, the middle matrix K has to be a 16×4 matrix, to follow the rules of matrix multiplication. In addition, the input signal x[n] has to be sampled, sixteen values at a time, to conform with the rules of matrix multiplication, since the first matrix that x[n] will multiply with is the 16×1 prototype matrix (W).

In an analysis system with four bandpass analysis filters, sixteen values of a signal x[n] are manipulated at one time. FIG. 4 displays an arbitrary signal that is presented to facilitate the conceptual understanding of the invention. The first sixteen values of the window w[n] could be represented in a 16×1 column matrix. A prototype window(W) is applied to the 16×1 column matrix. The sampler contains 16 values of the signal x[n]. In the case of an analysis system that creates 4 subbands, the windowing function (W) is a 16×16 diagonal matrix, with off-diagonal values that are zero. The prototype(W), is represented mathematically as:

$$W = \begin{bmatrix} \cdot & & \\ & \cdot & \\ & w_{ij} & \\ & & \cdot \\ & & \cdot \end{bmatrix} \quad ij =$$

-continued 11, 12, 13, 14, 21, 22, 23, 24, 31, 32, 33, 34, 41, 42, 43, 44,

In the present example, the windowing function allows sixteen values of the input x[n] to be operated on at one time. After the first sixteen are operated on, the windowing function goes to the next sixteen. This process is done dynamically so that real-time communications can be performed.

A circuit implementation that would perform the operation ($W_{16 \times 16} * X_{16 \times 1}$, where $W_{16 \times 16}$ represents a mathematical implementation of the windowing circuitry implemented in a 16×16 matrix, and $X_{16 \times 1}$ represents sixteen values of the input signal, represented as a 16×1 column matrix) has a complexity of 16 multiplications and no additions.

Figure 5:
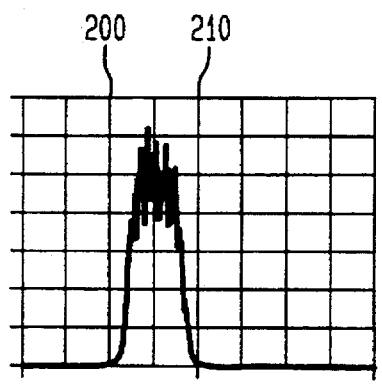
FIG. 5. displays a windowed signal.

After the window W is applied to the input signal x[n] presented in FIG. 4, a windowed signal such as the one presented in FIG. 5 is displayed. The windowed signal of FIG. 5 displays the portion of the input signal in FIG. 4 between the points denoted by 200 and 210. Therefore, by applying the window W to the input signal in FIG. 4 a portion of the input signal in FIG. 4 is made available to be processed by the reduction function (K) and the modulation function (G). The window W is used consecutively over all parts of the input signal, until the entire input signal is processed. Consequently, the window W is considered a prototype, since W is a basic building block that is repeatedly used to process the input signal displayed in FIG. 4.

A reduction process is then applied to the signal. The circuit implementation of the reduction process can be represented as a reduction matrix. In the present example, the reduction matrix(K) would take the form:

$$k = \begin{bmatrix} k_1 & 0 & 0 & 0 \\ 0 & k_2 & 0 & 0 \\ 0 & 0 & k_3 & 0 \\ 0 & 0 & 0 & k_4 \end{bmatrix};$$

$$k_1 = \begin{bmatrix} 1 \\ 1 \\ 1 \\ 1 \end{bmatrix}; k_2 = \begin{bmatrix} 1 \\ 1 \\ -1 \\ 1 \end{bmatrix}; k_3 = \begin{bmatrix} 1 \\ -1 \\ -1 \\ 1 \end{bmatrix}; k_4 = \begin{bmatrix} 1 \\ -1 \\ 1 \\ -1 \end{bmatrix}$$

Figure 6:
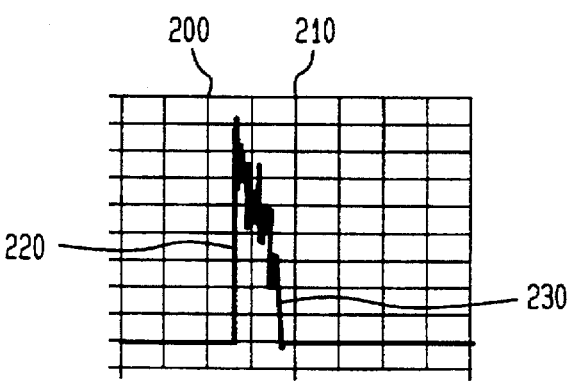
FIG. 6. displays a reduced signal.

In the present example, once the dimensions of the modulation matrix (G) and the prototype(W) are defined, the dimensions of the reduction matrix (K) are also defined to satisfy the rules of matrix multiplication. In the present example H is composed of four 4×4 matrices, G is a 4×4 matrix, and W is a 16×16 matrix, therefore K is a 16×4 matrix. The reduction matrix K is a block diagonal matrix (K1, K2, K3, and K4 are each groups of four numbers, that reside along the diagonal axis, and every other number is zero). Since K is chosen with 1's and −1's the K matrix has a complexity of 12 additions. The circuitry that implements the K matrix compares different values in the input signal and illuminates portions of the sampled values of x[n](i.e. the 16 sampled values in the example) that are duplications. FIG. 6 displays a reduced signal which is processed by the K matrix. In comparing FIG. 5 to FIG. 6 it is apparent that FIG. 6 has less values than the windowed signal of FIG. 5 between the range denoted by 200 and 210. FIG. 6 has values between the range denoted by 220 and 230. Fewer values in the reduced waveform presented in FIG. 6, derives from the fact that any portions of the windowed signal displayed in FIG. 5, that were duplications, have been removed by the reduction matrix (K). The underlying theory utilized in choosing the K matrix and how the elements of K are chosen are provided in Appendix I.

Lastly the signal is modulated by a G matrix, which is the mathematical representation for the circuit elements that perform the modulation function. The modulation function (G) in the present invention can be based on both sinusoidal and non-sinusoidal functions. While other modulation functions have been constrained to using sinusoidal functions as the basis for generating the values of the G matrix, the modulation function (G), can be based on any waveform (sinusoidal and non-sinusoidal), once $G^{-1}*G=I$, where $G^{-1}$ is the inverse of the modulation function and I is the identity matrix. In addition, the G matrix can be a non-separable matrix so that a large number of degrees of freedom can be applied to the system. In the present example which creates four subbands, the G matrix would be a 4×4 matrix, consequently the matrix would have 16 degrees of freedom. When the G matrix is applied to the input signal x[n], the circuitry required to perform the operations($G^T*K^T*W^T*X$) would perform 12 additions and 16 multiplications. Since G can be based on non-sinusoidal functions, the sample space of G has significantly increased, because now G can be a function of any waveform. The underlying theory for defining G and how the elements of G are chosen are presented in Appendix I.

Figure 7:
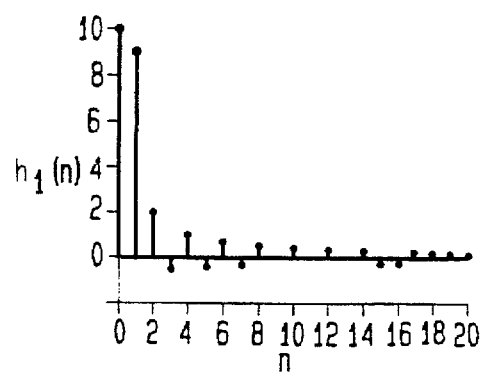
FIG. 7. displays a part of the modulated(filtered) signal.

The modulation function takes the prototype(window W) and then modulates the window W along a frequency spectrum. Therefore, just as in the one-dimensional case, one prototype is made and then replicated along a frequency range. FIG. 7 displays the first 20 values of the input signal displayed in FIG. 4 after it has been processed by the circuitry represented by WKG. For ease of understanding, FIG. 7 displays 20 amplitude values plotted as a function of time(n).

Figure 3:
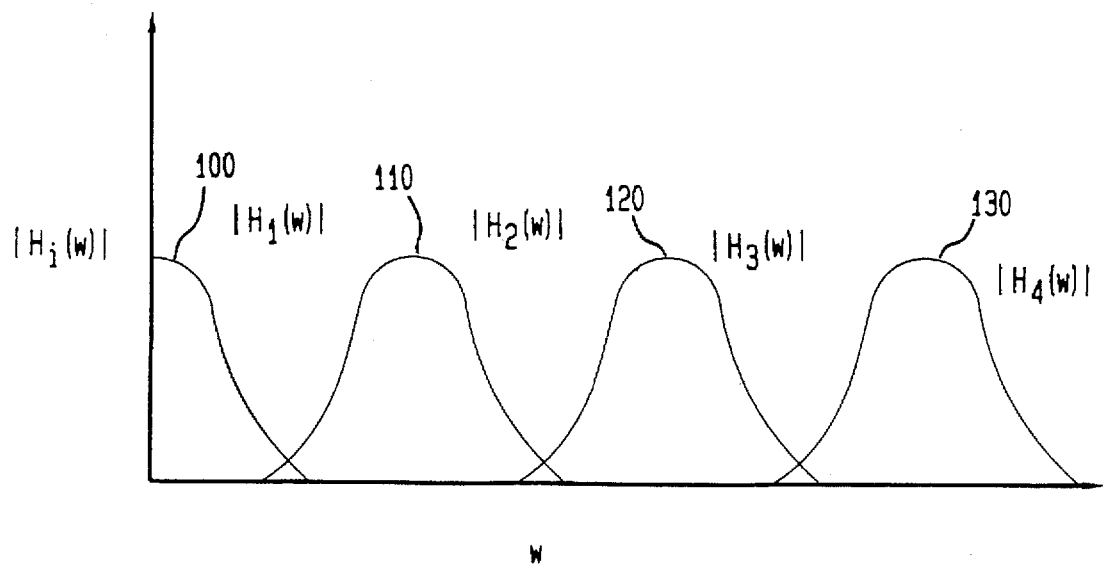
FIG. 3. displays the magnitude frequency response of four bandpass analysis filters in a one-dimensional system.

After the modulation function is applied to the signal, the input signal x[n] has gone through the entire filtering process and emerges as a filtered signal Y. The process detailed above can be represented mathematically as $Y=H^TX$, where $H^T=(W*K*G)^T$ for W, K, and G as defined above. The final output of the W*K*G processing is the waveform produced at the output filter H. FIG. 7 is the output of one of the filters in H (i.e. $h_1[n]$). The Fourier transform of the filter denoted in FIG. 7 could be represented as $|H_1(w)|$ denoted by 100 of FIG. 3. Therefore as W is moved through the input signal of FIG. 4, a different filter plot is produced as displayed in FIG. 7, which corresponds to a different filter magnitude frequency response as displayed in FIG. 3. For example, as W moves to the next portion of the input signal in FIG. 4, it would produce a filter plot in FIG. 7 that corresponds to 110, 120, or 130 , etc of FIG. 3.

The values of the filtered signal can be used to design the circuit implementation of the filter. If FIG. 7 denotes a plot of the first filter($h_1[n]$), the first five values associated with the filter would be as follows:

$h_1[0]=10$
$h_1[1]=9$
$h_1[2]=2$
$h_1[3]=-0.5$
$h_1[4]=1$

Figure 8:
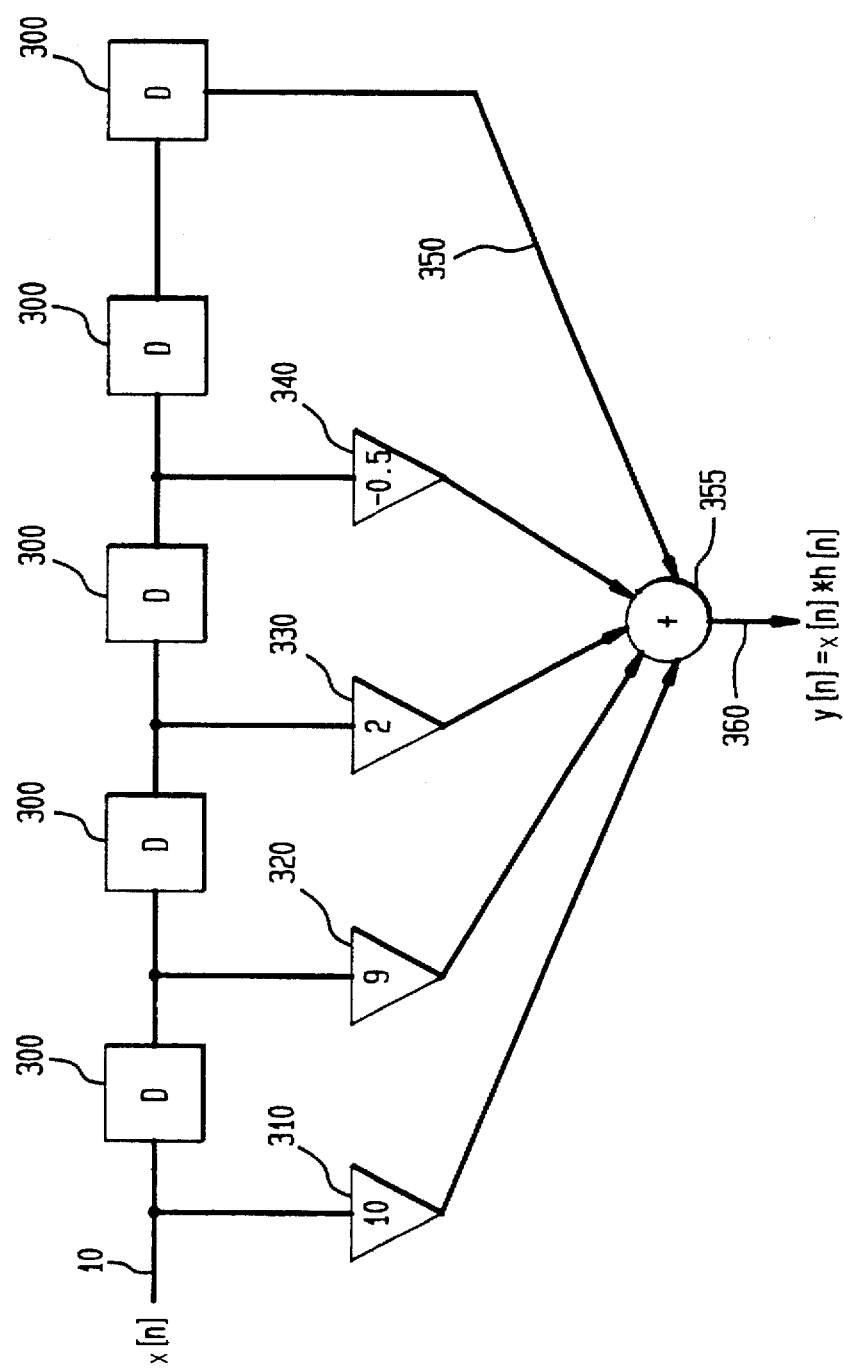
FIG. 8. displays a block diagram circuit implementation of the filtered signal displayed in FIG. 7.

FIG. 8 displays a potential implementation of the first filter $h_1[n]$. The input signal x[n] is delayed through a series of delay circuits 300. The input signal x[n] is then multiplied by a number of multipliers. At t=0, $h_1[0]=10$ as denoted by 310; at t=1, $h_1[1]=9$ as denoted by 320; at t=2, $h_1[2]=2$ as denoted by 330; at t=3, $h_1[3]=-0.5$ as denoted by 340; and at t=4, $h_1[4]=1$ as denoted by 350. The output of the respective multipliers is processed by an adder 355, to produce the filtered signal y[n] denoted by 360.

FIG. 8 displays a circuit implementation of the first filter $h_1[n]$, however it should be appreciated that the analysis system H is composed of the filters $h_1 \ldots h_4$, which when combined form a matrix that could be implemented as a circuit. Therefore each matrix of numbers(W,K, and G) are matrix representations of circuits including circuit components such as adders, multipliers, subtractors, and delay elements. As a result, the number values in these matrices carry a physical meaning. Therefore finding the numbers for these matrices, is the same as finding the circuit elements that implement the filters.

Table I given below summarizes the complexity of the circuitry elements used to implement one example of the disclosed coding technique. The complexity of the first filter $h_1[n]$, displayed in FIG. 8, is a function of the delay elements, multipliers and adders required to implement the circuit. Since the block diagrams of FIG. 8 correspond to Transistor—Transistor Logic (TTL) logic elements, Junction Field Effect Transistors (JFETs) or Metal-Oxide-Semiconductor Field Transistors (MOSFETs) the lower the amount of elements required, the easier it is to implement the circuit.

TABLE I

|  |  | Multiplications | Additions |
|---|---|---|---|
| Other art |  | 64 | 60 |
| Coder Using Local | W | 16 | 0 |
| Basis in multiple-dimensions | K | 0 | 12 |
|  | G | 16 | 12 |
|  |  | 32 | 24 |

As detailed in Table I the inventive technique has fewer multiplicative and additive elements than other systems. The inventive system has 32 multiplicative elements as opposed to the 64 elements in other systems, and 24 additive elements as opposed to the 60 additive elements required in other systems.

After the encoding is done with the disclosed method, the encoded signal can then be decoded with a decoder which has subband filters defined by the relationship $X=H^{-T}Y$ where $H^{-T}=G^{-T}*K^{-T}*W^{-T}$. The encoded signal would be processed through the inverse modulation function ($G^{-T}$), then the inverse reduction function ($K^{-T}$) and lastly, the inverse windowing function ($W^{-T}$). The output of the inverse windowing function would be a reconstructed signal.

Other Embodiments:

A similar methodology as described above would be utilized to implement an eight filter two-dimensional analysis system. To implement an analysis system with eight filters each of size 8×4, the analysis filter would be defined by equation (1).

$$H_{32\times 8}=W_{32\times 32}*K_{32\times 8}*G_{8\times 8} \quad (1)$$

The filter h1 would have the format:

$$\begin{matrix} h1_{11} & h1_{12} & h1_{13} & h1_{14} \\ h1_{21} & h1_{22} & h1_{23} & h1_{24} \\ h1_{31} & h1_{32} & h1_{33} & h1_{34} \\ h1_{41} & h1_{42} & h1_{43} & h1_{44} \\ h1_{51} & h1_{52} & h1_{53} & h1_{54} \\ h1_{61} & h1_{62} & h1_{63} & h1_{64} \\ h1_{71} & h1_{72} & h1_{73} & h1_{74} \\ h1_{81} & h1_{82} & h1_{83} & h1_{84} \end{matrix}$$

The analysis matrix would take the form:

$$[h_{1ij}|h_{2ij}|h_{3ij}|h_{4ij}|h_{5ij}|h_{6ij}|h_{7ij}|h_{8ij}]$$

where $h_{1ij}, h_{2ij} \ldots$, represent each of the eight filters.

The W matrix would be applied to an input signal that is represented by a 32×1 column vector. The window matrix would be a diagonal matrix in the form W=diag($W_{ij}$), where ij=11, 12, 13, 14, 21, 22, 23, 24, 41, 42, 43, 44, 51, 52, 53, 54, 61, 62, 63, 64, 71, 72, 73, 74, 81, 82, 83, 84. The circuit implementation of the W matrix would perform 32 multiplications to perform the W*X.

The reduction matrix K would be a block diagonal matrix that takes the form:

$$K = \begin{bmatrix} k_{11} & 0 & 0 & 0 & 0 & 0 & 0 & 0 \\ 0 & k_{12} & 0 & 0 & 0 & 0 & 0 & 0 \\ 0 & 0 & k_{21} & 0 & 0 & 0 & 0 & 0 \\ 0 & 0 & 0 & k_{22} & 0 & 0 & 0 & 0 \\ 0 & 0 & 0 & 0 & k_{31} & 0 & 0 & 0 \\ 0 & 0 & 0 & 0 & 0 & k_{32} & 0 & 0 \\ 0 & 0 & 0 & 0 & 0 & 0 & k_{41} & 0 \\ 0 & 0 & 0 & 0 & 0 & 0 & 0 & k_{42} \end{bmatrix}$$

$$k_{11} = k_{12} = \begin{bmatrix} 1 \\ 1 \\ 1 \\ 1 \end{bmatrix}$$

$$k_{21} = k_{22} = \begin{bmatrix} 1 \\ -1 \\ 1 \\ -1 \end{bmatrix}$$

$$k_{31} = k_{32} = \begin{bmatrix} 1 \\ 1 \\ -1 \\ -1 \end{bmatrix}$$

$$k_{41} = k_{42} = \begin{bmatrix} 1 \\ -1 \\ -1 \\ 1 \end{bmatrix}$$

The circuit required to perform the operations in the K matrix would have to perform 24 additions.

Lastly the basis (G) would be any non-separable matrix that was defined by the equation $G^{-1}*G=I$. The circuit required to perform the operations of the G matrix would require 64 multiplication and 56 additions.

A comparison of the implementation complexity in an eight subband system is provided in Table II.

TABLE II

| | | Multiplications | Additions |
|---|---|---|---|
| Other systems | | 256 | 248 |
| Coder Using | W | 32 | 0 |
| Basis in multiple-dimensions | K | 0 | 24 |
| | G | 64 | 56 |
| | | 96 | 80 |

In addition to the different embodiments of multi-dimensional filters defined above, the capability of increasing the sample space of the modulation function G can also be applied in one-dimension signals, by allowing G to be based on non-sinusoidal functions. In addition, the technique can be extended to multi-dimensional analysis/synthesis systems that use separable filters based on non-sinusoidal functions, by applying the one-dimensional approach to each dimension of the multi-dimensional signal since the signal is separable. For example, with a one-dimensional filter based on non-sinusoidal functions, an image could first be processed along the horizontal direction and then along the vertical direction. As a result, a one-dimensional filter can be used on a two-dimensional signal, but the filter would be separable and based on non-sinusoidal functions.

While several embodiments of the invention are disclosed and described, it should be appreciated that various modifications may be made without departing from the spirit of the invention or the scope of the subjoined claims.

Part I
Definitions

- If $y$ is a vector, its $a$-th element is denoted as $y[a]$. If it is a matrix, then $y[a,b]$ denotes the element in row $a$ and column $b$.

- If $y$ is a column vector with $A > B$ rows, then $L_B(y)$ is a column vector with $B$ rows defined as $$L_B(y)[a] = y[a] \quad a = 1, \ldots, B \tag{2}$$

If $y$ is a matrix, then $L_B(y)$ is the matrix whose columns are obtained by applying $L_B$ to the corresponding columns of $y$.

- Operation between binary vectors (that is, vectors whose components are 0 or 1) are considered modulo 2. In particular, the product between binary matrices will be carried out with addition and multiplication modulo 2 (respectively, the logical operators XOR and AND).

- A $b$-bit binary number $a = a_{b-1} \ldots a_0$, when left-multiplied by a matrix, will be considered as a binary column vector defined as $$a[c] \triangleq a_{c-1} \quad c = 1, \ldots, b \tag{3}$$

- Function $\lfloor \cdot \rfloor$ is defined as $$\lfloor a \rfloor = b \quad b \in \mathbb{Z}, b \leq a < b+1 \tag{4}$$

- Function $\varphi$ is defined as $$\varphi(c,b) \triangleq \begin{cases} c & \text{if } b = 0 \\ \sqrt{1-c^2} & \text{if } b = 1 \end{cases} \tag{5}$$

- Vector $e_a$ is defined as $$e_a[b] = \begin{cases} 1 & \text{if } a = b \\ 0 & \text{else} \end{cases} \tag{6}$$

- The *path vector* $P_{i,j}$ for $C_{i,j}$ is a column vector whose components are defined as $$P_{i,j}[d] \triangleq \begin{cases} 0 & \text{if the path to } C_{i,j} \text{ goes } \textit{left} \text{ at level } d \\ 1 & \text{if the path to } C_{i,j} \text{ goes } \textit{right} \text{ at level } d \end{cases} \quad (7)$$

- If $y$ is a $A \times B$ full-rank matrix, with $B < A$, then $VS(y)$ is defined as the vector space generated by the columns of $y$.

Part-II
How to figure out the matrices in (1)

Follow the following steps:

1. Let $M$ be the dimension of the signal definition space $Z^M$.

2. Choose a sampling lattice $\Lambda(D) \subset Z^M$.

3. Choose a support $B$ having a finite number of points and such that $$\cup_{t \in \Lambda(D)} (t + B) = Z^M \quad (8)$$

4. Decompose $B$ according to the algorithm presented in Part III.

5. Choose a suitable set of symmetries with the algorithm in part IV.

6. Find $W$ and $K$ by using the informations obtained in the fourth step, according to algorithm presented in part X.

Part IV
Decomposition of $B$

For each point $x \in B$ define the *label function* $l(x)$ as $$l(x) \triangleq \{t \in \Lambda(\mathbf{D}) : x - t \in B\} \qquad (9)$$

Since $|B|$ is finite, then $|l(x)|$ is finite too.

1. Compute $l(x)$ for each $x \in B$

2. Define equivalence relation $x_1 \approx x_2$ as $l(x_1) = l(x_2)$.

3. The partition of $B$ induced by $\approx$ is the wanted partition. Denote it with $\mathcal{P}_B$.

Part IX

Choice of symmetries

It is possible to show that for each $C_b \in \mathcal{P}_B$ and $t \in \Lambda(\mathbf{D})$ $$(t + C_b) \notin \mathcal{P}_B \Leftrightarrow (t + C_b) \cap B = \emptyset \tag{10}$$

In other words, if $t + C_b$ has nonempty intersection with $B$ it must belong to $\mathcal{P}_B$.

We will say that $C_{b_1}$ and $C_{b_2}$, both in $\mathcal{P}_B$, are *linked* and will write $C_{b_1} \leftrightarrow C_{b_2}$ if it exists $t \in \Lambda(\mathbf{D})$ such that $C_{b_1} = t + C_{b_2}$.

Relation $\leftrightarrow$ is an equivalence relation, therefore it decomposes $\mathcal{P}_B$ into equivalence classes $\mathcal{O}_1, \mathcal{O}_2, \ldots, \mathcal{O}_{N_{CL}}$, with $N_{CL}$ equal to the number of equivalence classes.

1. For each $i$ from 1 to $N_{CL}$ 1.1. Find a binary tree with $|\mathcal{O}_i|$ leaves and assign a set $C_b \in \mathcal{O}_i$ to each leaf. Let $\ell$ be the number of levels of the tree. Note that with each $C_{i,j}$ is associated a *path vector* $P_{i,j}$ defined in Part IV, equation (7).

1.2. Rename the sets $C_b \in \mathcal{O}_i$ as $C_{i,0} \ldots C_{i,|\mathcal{O}_i|-1}$, by assigning $C_{i,0}$ to a leaf of deep $\ell$. Note that each $C_{i,j}$ can always be expressed as $C_{i,j} = t_j + C_{i,0}$.

1.3. By using the algorithm in part VI, find a structure for $C_{i,0}$.

1.4. For $j$ from 1 to $|\mathcal{O}_i| - 1$ 1.4.1. Translate the structure of $C_{i,0}$ for $C_{i,j}$ with the algorithm in Part VII.

1.5. For $j$ from 0 to $|\mathcal{O}_i| - 1$ 1.5.1. Choose the signs of $C_{i,j}$ with the algorithm in Part VIII.

Part VI

Finding the structure for $C_{i,0}$

Finding the *structure* for set $C_{i,j}$, located to level $\ell_j$ of the tree found in Part IV, it means to partition $C_{i,j}$ as the union of $\mathcal{D}_{i,j,k}$, $k = 1,\ldots,q$, for some $q \in \mathbf{Z}$, with $|\mathcal{D}_{i,j,k}| = 2^{n_k}$, $n_k \in \mathbf{Z}$, and to associate with each $\mathcal{D}_{i,j,k}$:

- An $\ell_j \times n_k$ binary matrix $S_{i,j,k}$,
- an $\ell_j \times (\ell_j - n_k)$ binary matrix $M_{i,j,k}$,
- an ordering assigning to each $x \in \mathcal{D}_{i,j,k}$ an unique integer between 0 and $2^{n_k} - 1$,
- a weight $w_{i,j,k} \in \{0,1\}$ and
- a vector $\sigma_{i,j,k} = [w_1,\ldots,w_{\ell_j}]$ of $\ell_j$ real numbers between 0 and 1, inclusive.

To obtain the structure for each $\mathcal{D}_{i,j,k}$ first one has to find a structure for $C_{i,0}$, then, according to the algorithm in Part IV, the other structures can be obtained by translating this one. To find the structure for $C_{i,0}$ use the following algorithm:

1. Partition set $C_{i,0}$ into sets $\mathcal{D}_{i,0,1}, \mathcal{D}_{i,0,2},\ldots,\mathcal{D}_{i,0,q}$, where, for each $k = 1, 2,\ldots,q$, $|\mathcal{D}_{i,0,k}| = 2^{n_k}$ with $n_k \in \mathbf{Z}$ and $0 \le n_k \le \ell$.

2. For each $k$ between 1 and $q$ 2.1. Choose a basis of vector space $(\mathbf{Z}/2\mathbf{Z})^\ell$. Use $n_k$ vectors of such a basis as columns of matrix $S_{i,0,k}$ and the others as columns of matrix $M_{i,0,k}$. If $n_k = \ell$, then define $M_{i,0,k}$ as null $\ell \times 1$ column vector.

2.2. Number the points $x \in \mathcal{D}_{i,0,k}$ with the integers between 0 and $2^{n_k} - 1$ and identify them with the column vector whose entries are the $n_k$ bits of the binary representation of the corresponding number.

2.3. Assign to $\mathcal{D}_{i,0,k}$ the weight $w_{i,0,k}$ computed as $$w_{i,0,k} = \begin{cases} 1 & \text{if } P_{i,0}^T M_{i,0,k} = 0 \\ 0 & \text{else} \end{cases} \quad (11)$$

2.4. Choose a vector $\sigma_{i,0,k} \triangleq [w_1,\ldots,w_\ell]$ where $w_d$, $d = 1,\ldots,\ell$, are defined as $$w_d \triangleq \begin{cases} 1/\sqrt{2} & \text{if vector } e_d \text{ belongs to } VS(M_{i,0,k}) \\ \alpha_{i,k,d} & \text{else} \end{cases} \quad (12)$$

where $\alpha_{i,k,d}$ is any real value between 0 and 1 inclusive.

Part VII

Translation of structure from $\mathcal{C}_{i,0}$ to $\mathcal{C}_{i,j}$

1. Let $\ell_j$ be the level of $\mathcal{C}_{i,j}$.
2. Let $R_{i,j} = P_{i,j} \oplus P_{i,0}$.
3. Let $a = 1$
4. For $k$ from 1 to $q$ 4.1. Define sets $$\mathcal{D}_{i,j,a+b} \stackrel{\Delta}{=} \{t_j + x : x \in \mathcal{D}_{i,0,k}, \lfloor x/2^{\ell_j} \rfloor = b\} \quad b = 0, 1, \ldots, 2^{n_k - \ell_j} - 1 \tag{13}$$

and define their order by associating with $t_j + x \in \mathcal{D}_{i,j,a+b}$ the number $x \mod 2^{\ell_j}$. Assign to sets $\mathcal{D}_{i,j,a+b}$:

- Matrices $$M_{i,j,a+b} \stackrel{\Delta}{=} L_{\ell_j}(M_{i,0,k}) \quad b = 0, 1, \ldots, 2^{n_k - \ell_j} - 1 \tag{14}$$

$$S_{i,j,a+b} \stackrel{\Delta}{=} L_{\ell_j}(S_{i,0,k}) \quad b = 0, 1, \ldots, 2^{n_k - \ell_j} - 1, \tag{15}$$

- weight $$w_{i,j,a+b} = \begin{cases} 1 & \text{if } P^T_{i,j} M_{i,j,a+b} = 0 \\ 0 & \text{else} \end{cases}, \tag{16}$$

- and vector $\sigma_{i,j,a+b}$ defined as $$\sigma_{i,j,a+b}[d] = \varphi(R_{i,j}[d], \sigma_{i,0,k}[d]), \quad d = 1, \ldots, \ell_j, \tag{17}$$

where function $\varphi$ is defined in Part II, equation (5).

4.2. Put $a = a + 2^{n_k - \ell_j}$

Part VIII
Choice of signs

Let $C_{i,j}$ be a set in $\mathcal{O}_i$. Associate with $C_{i,j}$ the function $s_{i,j}$, mapping $C_{i,j}$ into $\{+1, -1\}$ and defined by following algorithm.

1. Let $x$ be a point of $C_{i,j}$, and let $\mathcal{D}_{i,j,k}$ be the (unique) subset of $C_{i,j}$ such that $x \in \mathcal{D}_{i,j,k}$. For each set $C_{i,j} \in \mathcal{O}_i$ define function $s_{i,j}$ as:

$$s_{i,j}(x) = w_{i,j,k}(-1)^{P_{i,j}^T S_{i,j,k} x} \qquad (18)$$

Part VIII
Choice of weights

Let $x$ be a point of $\mathcal{C}_{i,j}$ and let $\mathcal{D}_{i,j,k}$ be the (unique) subset of $\mathcal{C}_{i,j}$ such that $x \in \mathcal{D}_{i,j,k}$. Let $\sigma_{i,j,k}$ be the weight vector associated with $\mathcal{D}_{i,j,k}$. Define function $$\Omega(x) \triangleq \prod_{d=1}^{\ell_j} \varphi(y[d], \sigma_{i,j,k}[d]) \tag{19}$$

where $y \triangleq S_{i,j,k} x$.

Part IX
Find matrices

With the decomposition operated so far, each point $x$ of $B$ can be identified with four indexes:

1. index $i$ of class $\mathcal{O}_i$, 2. index $j$ of $\mathcal{C}_{i,j}$ in $\mathcal{O}_i$, 3. index $k$ of $\mathcal{D}_{i,j,k}$ in $\mathcal{C}_{i,j}$, 4. index $h$ of $x$ in $\mathcal{D}_{i,j,k}$ assigned by the ordering chosen in $\mathcal{D}_{i,j,k}$.

Therefore, in the following, we will consider the points of $B$ as four-tuple $\{i,j,k,h\}$. Note that, in analogous way, sets $\mathcal{D}_{i,j,k}$ can be identified with the 3-tuples $\{i,j,k\}$.

Matrix $K$ has one column for each $\mathcal{D}_{i,j,k}$ and one row for each $x \in B$, while matrix $W$ is a $|B| \times |B|$ square matrix. To figure out matrices $K$ and $W$ proceed as follows 1. Order points $x = \{i,j,k,h\} \in B$ and sets $\mathcal{D}_{i,j,k} = \{i,j,k\}$ according to a lexicographic order. Index the columns of $K$ with the 4-tuples $\{i,j,k,h\}$ and the rows with the 3-tuples $\{i,j,k\}$, according to such ordering.

2. Elements of matrix $K$ are defined as $$K[\{i_1,j_1,k_1,h_1\},\{i_2,j_2,k_2\}] = \begin{cases} 0 & \text{if } \{i_1,j_1,k_1\} \neq \{i_2,j_2,k_2\} \\ s_{i,j}(\{i_1,j_1,k_1,h_1\}) & \text{else} \end{cases} \quad (20)$$

where $s_{i,j}$ is the function defined in Part VIII, equation (18).

3. Matrix $W$ is a diagonal matrix defined as $$W[\{i,j,k,h\},\{i,j,k,h\}] \triangleq \Omega(\{i,j,k,h\}), \quad (21)$$

where $\Omega$ is defined in Part VIII, equation (19).

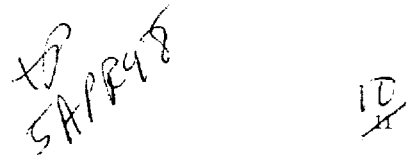

Table 1: Label function for $B$ and $\Lambda(\mathbf{D})$

| $C_i$ | $x$ | $l(x)$ |
|---|---|---|
| $C_0$ | (0,0) | {( 0, 0), ( 0, 2), ( 2, 0), ( 2, 2)} |
|  | (0,1) | {( 0, 0), ( 0, 2), ( 2, 0), ( 2, 2)} |
|  | (1,0) | {( 0, 0), ( 0, 2), ( 2, 0), ( 2, 2)} |
|  | (1,1) | {( 0, 0), ( 0, 2), ( 2, 0), ( 2, 2)} |
| $C_1$ | (2,0) | {( 0, 0), ( 0, 2), (-2, 0), (-2, 2)} |
|  | (2,1) | {( 0, 0), ( 0, 2), (-2, 0), (-2, 2)} |
|  | (3,0) | {( 0, 0), ( 0, 2), (-2, 0), (-2, 2)} |
|  | (3,1) | {( 0, 0), ( 0, 2), (-2, 0), (-2, 2)} |
| $C_2$ | (2,2) | {( 0, 0), ( 0,-2), (-2, 0), (-2,-2)} |
|  | (2,3) | {( 0, 0), ( 0,-2), (-2, 0), (-2,-2)} |
|  | (3,2) | {( 0, 0), ( 0,-2), (-2, 0), (-2,-2)} |
|  | (3,3) | {( 0, 0), ( 0,-2), (-2, 0), (-2,-2)} |
| $C_3$ | (0,2) | {( 0, 0), ( 0,-2), ( 2, 0), ( 2,-2)} |
|  | (0,3) | {( 0, 0), ( 0,-2), ( 2, 0), ( 2,-2)} |
|  | (1,2) | {( 0, 0), ( 0,-2), ( 2, 0), ( 2,-2)} |
|  | (1,3) | {( 0, 0), ( 0,-2), ( 2, 0), ( 2,-2)} |

Part XI
Example

1 Choice of $B$ and $\Lambda(\mathbf{D})$

Let $B$ the two–dimensional set $\{0,1,2,3\} \times \{0,1,2,3\}$. Choice as sampling lattice the lattice whose basis is $$\mathbf{D} \triangleq \begin{bmatrix} 2 & 0 \\ 0 & 2 \end{bmatrix} \qquad (22)$$

2 Partitioning of $B$

Label function $l(x)$, for this choice of $B$ and $\Lambda(\mathbf{D})$ is given in Table 1.

3 Choice of symmetries

As is easily seen from Table 1, there are four sets $C_i$ and, as it is easily verified Table 2: Table of path vectors

| Set | Path vector |
|---|---|
| $\mathcal{C}_{1,0}$ | [0, 0] |
| $\mathcal{C}_{1,1}$ | [0, 1] |
| $\mathcal{C}_{1,2}$ | [1, 0] |
| $\mathcal{C}_{1,3}$ | [1, 1] |

$$\begin{aligned} \mathcal{C}_1 &= \mathcal{C}_0 + (2,0) \Rightarrow \mathcal{C}_1 \leftrightarrow \mathcal{C}_0 \\ \mathcal{C}_2 &= \mathcal{C}_0 + (2,2) \Rightarrow \mathcal{C}_2 \leftrightarrow \mathcal{C}_0 \\ \mathcal{C}_3 &= \mathcal{C}_0 + (0,2) \Rightarrow \mathcal{C}_3 \leftrightarrow \mathcal{C}_0 \end{aligned} \qquad (23)$$

From which it follows $\mathcal{C}_i \leftrightarrow \mathcal{C}_j$, $\forall i,j \in \{0,1,2,3\}$, because of the transitive property of equivalence relation $\leftrightarrow$. Therefore, there is only one $\mathcal{O}_1 \triangleq \{\mathcal{O}_0, \mathcal{O}_1, \mathcal{O}_2, \mathcal{O}_3\}$.

For coherence with the previous parts rename $\mathcal{C}_i$ as $\mathcal{C}_{1,i}$. The path vectors for $\mathcal{C}_{1,i}$ are reported in Table 2

4  Structure of $\mathcal{C}_{1,0}$

In this case $\ell = 2$ and $|\mathcal{C}_{1,0}| = 4 = 2^2$. A possible decomposition for $\mathcal{C}_{1,0}$ is formed by the only set $\mathcal{D}_{1,0,1} = \mathcal{C}_{1,0}$. In this case $n_0 = 2$.

- A possible basis for $(\mathbf{Z}/2\mathbf{Z})^\ell = (\mathbf{Z}/2\mathbf{Z})^2$ is $$\begin{bmatrix} 1 & 0 \\ 0 & 1 \end{bmatrix} \qquad (24)$$

Therefore, since $\ell = n_0 = 2$, $$\begin{aligned} S_{1,0,1} &= \begin{bmatrix} 1 & 0 \\ 0 & 1 \end{bmatrix} = I_2 \\ M_{1,0,1} &= \begin{bmatrix} 0 \\ 0 \end{bmatrix} \end{aligned} \qquad (25)$$

- The point belonging to $\mathcal{D}_{1,0,1}$ are $(0,0)$, $(0,1)$, $(1,0)$ and $(1,1)$. They can be enumerated as follows:

$$\begin{aligned}(0,0) &\rightarrow 0 = 00_2 = [0,0]^T \\ (0,1) &\rightarrow 1 = 01_2 = [0,1]^T \\ (1,0) &\rightarrow 2 = 10_2 = [1,0]^T \\ (1,1) &\rightarrow 3 = 11_2 = [1,1]^T\end{aligned} \qquad (26)$$

- Since $$P_{1,0}{}^T M_{1,0,1} = \begin{bmatrix} 0 & 0 \end{bmatrix} \begin{bmatrix} 0 \\ 0 \end{bmatrix} = 0, \qquad (27)$$

to $\mathcal{D}_{1,0,1}$ is assigned the weight $w_{1,0,1} = 1$.

- Since the vector space generated by $M_{1,0,1} = [0,0]^T$ contains only the null vector, both the components of $\sigma_{1,0,1}$ are free. Choose, for example $$\begin{aligned}\alpha_{1,1,1} &= 0.28 \\ \alpha_{1,1,2} &= 0.6\end{aligned} \qquad (28)$$

5 Translation of the structure

In this case $\ell_j = 2$ for each $j = 0, \ldots, 3$. Consider, for example, $j = 1$.

-

$$R_{1,1} = P_{1,0} \oplus P_{1,1} = \begin{bmatrix} 0 \\ 0 \end{bmatrix} \oplus \begin{bmatrix} 0 \\ 1 \end{bmatrix} = \begin{bmatrix} 0 \\ 1 \end{bmatrix} \qquad (29)$$

- let $a = 1$. Since $q = 1$ only one cycle (for $k = 1$) will be executed.

- Since the values associated with $x \in \mathcal{C}_{1,0}$ are 0, 1, 2 and 3, then $\lfloor x/2^{\ell_j} \rfloor = \lfloor x/2^2 \rfloor = \lfloor x/4 \rfloor = 0$ for each $x \in \mathcal{C}_{1,0}$; therefore, there is $\mathcal{D}_{1,1,a+b} = \mathcal{D}_{1,1,1+b}$, only for $b = 0$, and $$\mathcal{D}_{1,1,0+1} = \mathcal{D}_{1,1,1} = \mathcal{D}_{1,0,1} + (2,0) \qquad (30)$$

The resulting ordering in $\mathcal{D}_{1,1,1}$ is $$\begin{aligned}(2,0) &\rightarrow 0 = 00 = [0,0]^T \\ (2,1) &\rightarrow 1 = 01 = [0,1]^T \\ (3,0) &\rightarrow 2 = 10 = [1,0]^T \\ (3,1) &\rightarrow 3 = 11 = [1,1]^T\end{aligned} \qquad (31)$$

| $\mathcal{C}_{1,j}$ | $\mathcal{D}_{1,j,k}$ | $S_{1,j,1}$ | $M_{1,j,1}$ | Ordering | $w_{1,j,1}$ | $\sigma_{1,j,1}$ |
|---|---|---|---|---|---|---|
| $\mathcal{C}_{1,0}$ | $\mathcal{D}_{1,0,1}$ | $I_2$ | $[0,0]^T$ | $(0,0),(1,0),(0,1),(1,1)$ | 1 | $[0.28, 0.6]^T$ |
| $\mathcal{C}_{1,1}$ | $\mathcal{D}_{1,0,1}$ | $I_2$ | $[0,0]^T$ | $(2,0),(3,0),(2,1),(3,1)$ | 1 | $[0.28, 0.8]^T$ |
| $\mathcal{C}_{1,2}$ | $\mathcal{D}_{1,0,1}$ | $I_2$ | $[0,0]^T$ | $(0,2),(1,2),(0,3),(1,3)$ | 1 | $[0.96, 0.6]^T$ |
| $\mathcal{C}_{1,3}$ | $\mathcal{D}_{1,0,1}$ | $I_2$ | $[0,0]^T$ | $(2,2),(3,2),(2,3),(3,3)$ | 1 | $[0.96, 0.8]^T$ |

Table 3: Structures

- Since $\ell_j = \ell = 2$ the matrices associated with $\mathcal{D}_{1,1,1}$ are $$\begin{aligned}
S_{1,1,1} &= L_2(S_{1,0,1}) \\
&= S_{1,0,1} = \begin{bmatrix} 1 & 0 \\ 0 & 1 \end{bmatrix} = I_2 \\
M_{1,1,1} &= L_2(M_{1,0,1}) \\
&= M_{1,0,1} = \begin{bmatrix} 0 \\ 0 \end{bmatrix}
\end{aligned} \qquad (32)$$

- Since $$R_{1,1}{}^T M_{1,1,1} = \begin{bmatrix} 0 & 1 \end{bmatrix} \begin{bmatrix} 0 \\ 0 \end{bmatrix} = 0, \qquad (33)$$

to $\mathcal{D}_{1,1,1}$ is assigned the weight $w_{1,1,1} = 1$.

- Vector $\sigma_{1,1,1}$ is defined as $$\begin{aligned}
\sigma_{1,1,1}[1] &= \varphi(R_{1,1}[1], \sigma_{1,0,1}[1]) \\
&= \varphi(0, 0.28) = 0.28 \\
\sigma_{1,1,1}[2] &= \varphi(R_{1,1}[2], \sigma_{1,0,1}[2]) \\
&= \varphi(1, 0.6) \\
&= \sqrt{1 - 0.6^2} \\
&= \sqrt{0.36} = 0.8
\end{aligned} \qquad (34)$$

A similar method can be used for the others $\mathcal{C}_{i,j}$. The structures for all $\mathcal{C}_{1,j}$ are listed in Table 3.

| $\mathcal{C}_{1,j}$ | $x$ | $s_{1,j}(x)$ | $\mathcal{C}_{1,j}$ | $x$ | $s_{1,j}(x)$ |
|---|---|---|---|---|---|
| $\mathcal{C}_{1,0}$ | (0,0) | 1 | $\mathcal{C}_{1,2}$ | (0,2) | 1 |
| | (1,0) | 1 | | (1,2) | 1 |
| | (0,1) | 1 | | (0,3) | $-1$ |
| | (1,1) | 1 | | (1,3) | $-1$ |
| $\mathcal{C}_{1,1}$ | (2,0) | 1 | $\mathcal{C}_{1,3}$ | (2,2) | 1 |
| | (3,0) | $-1$ | | (3,2) | $-1$ |
| | (2,1) | 1 | | (2,3) | $-1$ |
| | (3,1) | $-1$ | | (3,3) | 1 |

Table 4:

6 Choice of the signs

Let $j = 1$. In order to compute the sign for, for example, $x = (3,0)$ one first has to compute $$y_{00} = P_{1,1}{}^T S_{1,1,1} x = \begin{bmatrix} 0 & 1 \end{bmatrix} \begin{bmatrix} 1 & 0 \\ 0 & 1 \end{bmatrix} \begin{bmatrix} 3 \\ 0 \end{bmatrix} = 0 \quad (35)$$

Therefore, since $w_{1,1,1} = 1$, function $s_{1,1}$ evaluated for $x = (3,0)$ assumes value $$s_{1,1}(3,0) = 1 \cdot (-1)^0 = -1 \quad (36)$$

In a similar way $s_{1,1}$ can be evalueted on each point of $\mathcal{C}_{1,1}$, obtaining:

$$\begin{aligned} s_{1,1}(2,0) &= 1 \cdot (-1)^0 = 1 \\ s_{1,1}(3,0) &= 1 \cdot (-1)^1 = -1 \\ s_{1,1}(2,1) &= 1 \cdot (-1)^0 = 1 \\ s_{1,1}(3,1) &= 1 \cdot (-1)^1 = -1 \end{aligned} \quad (37)$$

Similar method can be used for the other $\mathcal{C}_{1,j}$. The results are listed in Table 4.

7 Choice of weights

Consider $j = 1$. Each $x \in \mathcal{C}_{1,1}$ belongs also to $\mathcal{D}_{1,1,1}$. To evaluate $\Omega$ on, for example, $x = (2,1) \in \mathcal{C}_{1,1}$ one has first to compute $$y = S_{1,1,1} x = \begin{bmatrix} 1 & 0 \\ 0 & 1 \end{bmatrix} \begin{bmatrix} 0 \\ 1 \end{bmatrix} = \begin{bmatrix} 0 \\ 1 \end{bmatrix} \quad (38)$$

| $\mathcal{C}_{1,j}$ | $x$ | $\Omega(x)$ | $\mathcal{C}_{1,j}$ | $x$ | $\Omega(x)$ |
|---|---|---|---|---|---|
| $\mathcal{C}_{1,0}$ | (0,0) | 0.168 | $\mathcal{C}_{1,2}$ | (0,2) | 0.576 |
|  | (1,0) | 0.224 |  | (1,2) | 0.768 |
|  | (0,1) | 0.576 |  | (0,3) | 0.168 |
|  | (1,1) | 0.768 |  | (1,3) | 0.224 |
| $\mathcal{C}_{1,1}$ | (2,0) | 0.224 | $\mathcal{C}_{1,3}$ | (2,2) | 0.768 |
|  | (3,0) | 0.168 |  | (3,2) | 0.576 |
|  | (2,1) | 0.768 |  | (2,3) | 0.224 |
|  | (3,1) | 0.576 |  | (3,3) | 0.168 |

Table 5:

then $$\begin{aligned}\Omega(2,1) &= \varphi(\boldsymbol{y}[1],\sigma_{1,1,1}[1]) \cdot \varphi(\boldsymbol{y}[2],\sigma_{1,1,1}[2]) \\ &= \varphi(0,0.28) \cdot \varphi(1,0.8) \\ &= 0.28\sqrt{1-0.8^2} \\ &= 0.28 \cdot 0.6 = 0.168 \end{aligned} \quad (39)$$

By repeating the procedure for each $x \in \mathcal{C}_{1,1}$ one obtains $$\begin{aligned}\Omega(2,0) &= 0.224 \\ \Omega(3,0) &= 0.168 \\ \Omega(2,1) &= 0.768 \\ \Omega(3,1) &= 0.576 \end{aligned} \quad (40)$$

Similar for other $\mathcal{C}_{1,j}$. The final results are listed in Table 5

8 Find matrices

The representation of the points of $B$ as 4-tuples is given in Table 6 that also enumerates them in lexicographic order.

Matrix $K$ has four columns (one for each $\mathcal{D}_{1,j,1}$) and 16 rows (one for each $x \in B$). Consider, for example, the first column of $K$. Since the first $\mathcal{D}_{1,j,1}$ in the lexicographic order is $\mathcal{D}_{1,0,1}$, the first column of $K$ corresponds to set $\mathcal{D}_{1,0,1}$. The points belonging to $\mathcal{D}_{1,0,1}$ are $(0,0)$, $(1,0)$, $(0,1)$ and $(1,1)$ that are the first four points in the lexicographic order of table 6. Therefore, only the first four rows of the first column of $K$ will be not equal to 0 and, from table 4, one can see that such rows will be equal to 1. In a similar way one can construct all $K$.

Matrix $K$ has the form

Table 6:

| $x$ | $\{i,j,k,h\}$ | $x$ | $\{i,j,k,h\}$ |
|---|---|---|---|
| (0,0) | 1, 0, 1, 0 | (2,0) | 1, 2, 1, 0 |
| (0,1) | 1, 0, 1, 1 | (2,1) | 1, 2, 1, 1 |
| (1,0) | 1, 0, 1, 2 | (3,0) | 1, 2, 1, 2 |
| (1,1) | 1, 0, 1, 3 | (3,1) | 1, 2, 1, 3 |
| (0,2) | 1, 1, 1, 0 | (2,2) | 1, 3, 1, 0 |
| (0,3) | 1, 1, 1, 1 | (2,3) | 1, 3, 1, 1 |
| (1,2) | 1, 1, 1, 2 | (3,2) | 1, 3, 1, 2 |
| (1,3) | 1, 1, 1, 3 | (3,3) | 1, 3, 1, 3 |

|  | $\mathcal{D}_{1,0,1}$ | $\mathcal{D}_{1,1,1}$ | $\mathcal{D}_{1,2,1}$ | $\mathcal{D}_{1,3,1}$ |
|---|---|---|---|---|
| (0,0) | 1 | 0 | 0 | 0 |
| (1,0) | 1 | 0 | 0 | 0 |
| (0,1) | 1 | 0 | 0 | 0 |
| (1,1) | 1 | 0 | 0 | 0 |
| (2,0) | 0 | 1 | 0 | 0 |
| (3,0) | 0 | −1 | 0 | 0 |
| (2,1) | 0 | 1 | 0 | 0 |
| (3,1) | 0 | −1 | 0 | 0 |
| (0,2) | 0 | 0 | 1 | 0 |
| (1,2) | 0 | 0 | 1 | 0 |
| (0,3) | 0 | 0 | −1 | 0 |
| (1,3) | 0 | 0 | −1 | 0 |
| (2,2) | 0 | 0 | 0 | 1 |
| (3,2) | 0 | 0 | 0 | −1 |
| (2,3) | 0 | 0 | 0 | −1 |
| (3,3) | 0 | 0 | 0 | 1 |

Matrix $W$ it is a diagonal matrix with 16 rows and 16 columns, one for each $x \in B$. The, for example, third element of the diagonal of $W$ is the value that $\Omega$ assumes on the third point in the lexicographic order of Table 6, that is, point $(1,1)$. The corresponding value of $\Omega(1,1)$ can be found in Table 5 and it is 0.576. In this way all matrix $W$ can be constructed. Matrix $W$ has the form

|       | (0,0) | (1,0) | (0,1) | (1,1) | (2,0) | (3,0) | (2,1) | (3,1) | (0,2) | (1,2) | (0,3) | (1,3) | (2,2) | (3,2) | (2,3) | (3,3) |
|-------|-------|-------|-------|-------|-------|-------|-------|-------|-------|-------|-------|-------|-------|-------|-------|-------|
| (0,0) | 0.168 |       |       |       |       |       |       |       |       |       |       |       |       |       |       |       |
| (1,0) |       | 0.224 |       |       |       |       |       |       |       |       |       |       |       |       |       |       |
| (0,1) |       |       | 0.576 |       |       |       |       |       |       |       |       |       |       |       |       |       |
| (1,1) |       |       |       | 0.768 |       |       |       |       |       |       |       |       |       |       |       |       |
| (2,0) |       |       |       |       | 0.224 |       |       |       |       |       |       |       |       |       |       |       |
| (3,0) |       |       |       |       |       | 0.168 |       |       |       |       |       |       |       |       |       |       |
| (2,1) |       |       |       |       |       |       | 0.768 |       |       |       |       |       |       |       |       |       |
| (3,1) |       |       |       |       |       |       |       | 0.576 |       |       |       |       |       |       |       |       |
| (0,2) |       |       |       |       |       |       |       |       | 0.576 |       |       |       |       |       |       |       |
| (1,2) |       |       |       |       |       |       |       |       |       | 0.768 |       |       |       |       |       |       |
| (0,3) |       |       |       |       |       |       |       |       |       |       | 0.168 |       |       |       |       |       |
| (1,3) |       |       |       |       |       |       |       |       |       |       |       | 0.224 |       |       |       |       |
| (2,2) |       |       |       |       |       |       |       |       |       |       |       |       | 0.768 |       |       |       |
| (3,2) |       |       |       |       |       |       |       |       |       |       |       |       |       | 0.576 |       |       |
| (2,3) |       |       |       |       |       |       |       |       |       |       |       |       |       |       | 0.224 |       |
| (3,3) |       |       |       |       |       |       |       |       |       |       |       |       |       |       |       | 0.168 |

Finally, matrix $G$ can be every $4 \times 4$ orthogonal matrix. For example, one can choose $$G \triangleq \begin{bmatrix} 0.500 & 0.653 & 0.500 & 0.271 \\ 0.500 & 0.271 & -0.500 & -0.653 \\ 0.500 & -0.271 & -0.500 & 0.653 \\ 0.500 & -0.653 & 0.500 & -0.271 \end{bmatrix} \qquad (41)$$

obtained by normalization of the Discrete Cosine Transform on four points.

The invention claimed is:

1. A method of subbanding a multi-dimensional signal, comprising the steps of:
   utilizing a prototype for defining a plurality of processing regions of a multi-dimensional signal,
   reducing information redundancy by substantially eliminating repetitive values in at least a subset of said processing regions of said multi-dimensional signal, and
   modulating at least one of said processing regions to a different frequency region, thereby performing subbanding of the multi-dimensional signal.

2. A method of subbanding a multi-dimensional signal as claimed in claim 1 wherein said method of subbanding is performed with at least one non-separable, multi-dimensional filter.

3. A method of subbanding a multi-dimensional signal as claimed in claim 2 wherein said modulation step is performed with a modulation circuit based on a sinusoidal function.

4. A method of subbanding a multi-dimensional signal as claimed in claim 2 wherein said modulation step is performed with a modulation circuit based on a non-sinusoidal function.

5. A method of subbanding a multi-dimensional signal as claimed in claim 1 wherein said method of subbanding is performed with at least one separable filter and said modulation step is performed with a circuit based on a non-sinusoidal function.

6. A method of subbanding a multi-dimensional signal as claimed in claim 2 wherein said prototype is a circuit W, where W is defined by the relationship W=diag(Wij).

7. A method of subbanding a multi-dimensional signal as claimed in claim 2 wherein said reduction step is performed by a circuit implementation of a block diagonal matrix K.

8. A method of subbanding a multi-dimensional signal as claimed in claim 2 wherein said modulating step is performed by a circuit implementation of a modulation matrix G defined by the relationship $G^{-1}*G=I$.

9. A method of subbanding a multi-dimensional signal as claimed in claim 2 wherein said method is implemented in an analysis system.

10. A method of reconstructing a multi-dimensional signal subbanded by the method of claim 1 comprising the steps of:
    demodulating each of said processing regions,
    inserting said repetitive values back into each of said processing regions, and
    applying a prototype to place said processing regions back in consecutive order, thereby reconstructing said multi-dimensional signal.

11. A method of reconstructing as claimed in claim 10 wherein said method of reconstructing is performed with at least one non-separable, multi-dimensional filter.

12. A method of reconstructing as claimed in claim 10 wherein said demodulation step is performed with a modulation circuit based on the inverse of a sinusoidal function.

13. A method of reconstructing as claimed in claim 10 wherein said demodulation step is performed with a modulation circuit based on the inverse of a non-sinusoidal function.

14. A method of reconstructing as claimed in claim 10 wherein said prototype is a circuit defined by the relationship $W^{-1}$, where $W^{-1}$ is the inverse of a window matrix W.

15. A method of reconstructing as claimed in claim 10 wherein said reduction step is performed by a circuit implementation defined by the relationship $K^{-1}$, where $K^{-1}$ is the inverse of a reduction matrix K.

16. A method of reconstructing as claimed in claim 10 wherein said demodulating step is performed by a circuit defined by $G^{-1}$, where $G^{-1}$ is the inverse of a modulation matrix G.

17. A method of subbanding a multi-dimensional signal as claimed in claim 10 wherein said method is implemented in a synthesis system.

18. A communications system, comprising:
    an analysis system for processing a multi-dimensional signal, said analysis system including at least one filter, wherein said filter further comprises a prototyping means, a reduction means and a modulation means, for processing said multi-dimensional signal,
    a first sampler for sampling said multi-dimensional signal,
    a coding means for coding said multi-dimensional signal,
    a transmission means for transmitting said multi-dimensional signal,
    a decoding means for decoding said multi-dimensional signal,
    a second sampler for resampling said multi-dimensional signal, and
    a synthesis system for synthesizing said multi-dimensional signal, said synthesis system including at least one filter, wherein said filter further comprises an inverse prototyping means, an inverse reduction means and an inverse modulation means.

19. A communications system as claimed in claim 18 wherein said analysis system is implemented with circuits defined by the relationship $Y=H^T*X$, where $H^T=W*K*G$, where W is a window matrix, K is a reduction matrix and G is a modulation matrix.

20. A communications system as claimed in claim 18 wherein said synthesis system is implemented with circuits defined by the relationship $X=H^{-T}Y$, $H^{-T}=G^{-T}*K^{-T}*W^{-T}$, where W is a window matrix, K is a reduction matrix and G is a modulation matrix.

21. A method of subbanding a multi-dimensional signal using a filter characterized by a window matrix, a reduction matrix and a modulation matrix, said method comprising the steps of:
    parsing through said multi-dimensional signal in accordance with said window matrix, thereby producing a windowed signal,
    reducing similarities in said windowed signal in accordance with said reduction matrix, thereby producing a reduced signal, and
    modulating said reduced signal in accordance with said modulation matrix, thereby subbanding said multi-dimensional signal.

22. A method of subbanding a multi-dimensional signal as claimed in claim 21 wherein said modulating step is performed with a circuit based on a sinusoidal function.

23. A method of subbanding a multi-dimensional signal as claimed in claim 21 wherein said modulating step is performed with a circuit based on a non-sinusoidal function.

24. A multi-dimensional filter for processing a multi-dimensional signal, said multi-dimensional filter comprising:
    a prototype for sampling said multi-dimensional signal,
    a modulation means for consecutively moving said prototype through said multi-dimensional signal, and
    a reduction means, associated with said prototype and said modulation means, for reducing similarities in said multi-dimensional signal.

25. A method of processing a one-dimensional signal comprising the steps of:

sampling said one-dimensional signal with a prototype, reducing any similarities in said one-dimensional signal with a reduction means, and moving said prototype through said one-dimensional signal with a modulation means based on a non-sinusoidal function.

26. A method of processing a separable multi-dimensional signal, said method comprising the steps of:

performing the steps in claim 25 in each dimension of said multi-dimensional signal.

27. A method of designing a multi-dimensional filter for subbanding a multi-dimensional signal, said method comprising the steps of:

defining a prototype (W) governed by the relationship $W=\text{diag}(W_{ij})$, defining a modulator (G) selected from a sample space of functions, for modulating said prototype, wherein said modulator is governed by the relationship $G^{-1}*G=I$, and defining a reduction element (K) wherein said reduction element operates in conjunction with said prototype and said modulator in subbanding said multi-dimensional signal.

* * * * *